United States Patent Office 3,173,613
Patented Mar. 16, 1965

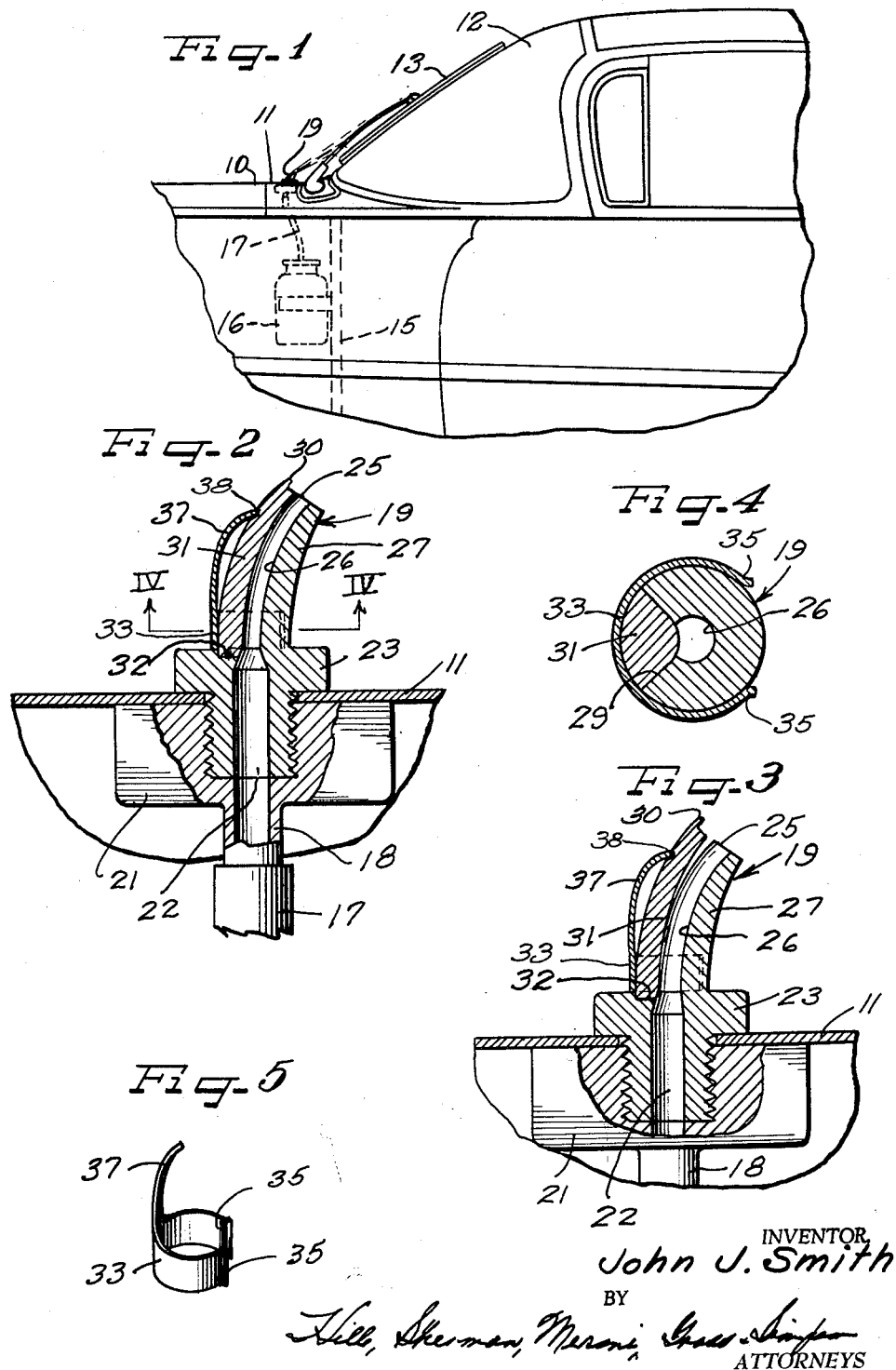

3,173,613
NOZZLE FOR WINDSHIELD WASHERS
AND THE LIKE
John J. Smith, 1516 Wolfram St., Chicago, Ill.
Filed Mar. 6, 1963, Ser. No. 263,306
6 Claims. (Cl. 239—284)

This invention relates to improvements in windshield washers and more particularly relates to an improved form of nozzle for such washers.

The windshield washers used to supply water to wash the windshields of automotive vehicles have relatively small diameter nozzles which frequently clog with dirt, ice or snow, rendering the windshield washer ineffective to wash the windshield.

Such washers cannot be cleaned without disconnecting the hose from the nozzle and for this reason the average automotive vehicle operator is required to have the nozzle cleaned at a service station or garage.

A principal object of the present invention is to improve upon the windshield washers heretofore in use by so constructing and arranging the nozzle spraying water on the windshield as to provide ready access to the nozzle orifice for cleaning, without disconnecting the system or removing the nozzle from the automotive vehicle.

A further object of the invention is to provide a novel and improved form of nozzle for windshield washers and the like in which the nozzle tube has a removable wall portion affording access to the interior of the tube for cleaning the nozzle.

A still further object of the invention is to provide a novel and improved nozzle for windshield washers and the like in which the nozzle tube has a removable sector extending along the side thereof opposite from the windshield and in which a simplified form of clamping means is provided to retain the sector to the nozzle tube.

These and other objects of the invention will appear from time to time as the following specification proceeds and with reference to the accompanying drawings wherein:

FIGURE 1 is a fragmentary diagrammatic view in side elevation of a portion of an automotive vehicle showing a windshield washing nozzle constructed in accordance with the principles of the invention in position to spray a windshield for cleaning purposes;

FIGURE 2 is a vertical sectional view taken through a nozzle constructed in accordance with the principles of the present invention showing a form of mounting for the nozzle on the cowl of an automotive vehicle and showing the removable wall portion of the nozzle in a closed position;

FIGURE 3 is a view somewhat similar to FIGURE 2, but showing the removable wall portion in an open position;

FIGURE 4 is a sectional view taken through the nozzle tube substantially along line IV—IV of FIGURE 2; and FIGURE 5 is a view showing a form of clip, which may be used to detachably hold the nozzle wall portion in position.

In the embodiment of the invention illustrated in the drawing, I have shown in FIGURE 1 a portion of the body of an automotive vehicle including a hood 10, a cowl 11 forming a rearward continuation of the hood and a windshield 12 at the rear of the cowl. I have also diagrammatically shown a windshield wiper 13 mounted at the base of the windshield, in a conventional manner, for wiping the windshield. The windshield wiper 13 may be of any form well known to those skilled in the art and is no part of the present invention so need not herein be shown or described further.

Within the hood 10 and mounted on a fire wall 15 is a container 16 forming a storage tank for windshield cleansing liquid, such as water or water having an antifreeze agent mixed therein.

A suction line 17 leads from the container 16 and is connected to a fitting 18 to supply water to a nozzle 19, shown as being mounted on the outside of the cowl, for spraying water on the windshield.

It is, of course, understood that two windshield wipers 13 are usually provided to wipe the entire windshield and that a separate nozzle is associated with each windshield wiper. The nozzle also may move back and forth with the windshield wiper arm (not shown), as is conventional with some forms of windshield washers. The suction for drawing cleansing liquid from the container 16 is usually attained from the intake manifold of the automotive vehicle and cleansing liquid is drawn from the container 16 and distributed to the windshield washer nozzle 19 in a manner well known to those skilled in the art, and no part of the present invention so not herein shown or described further.

The fitting 18 upon which the tube 17 is mounted is shown as extending from a gland nut 21, threaded on a nipple 22 and engaging the undersurface of the cowl 11 and retaining the nozzle 19 to said cowl in upstanding relation with respect thereto. As shown in FIGURES 2 and 3, the nipple 22 extends through the cowl 11 downwardly from a boss 23, which may have a rounded or hexagonal formation and which is retained in abutting engagement with the top of the cowl by the gland nut 21.

The boss 23 is shown as having the nozzle 19 extending upwardly from and formed integrally therewith.

The nozzle 19 is in the form of a tube curving inwardly toward the windshield as it extends upwardly from the boss 23 and having an orifice 25 at its upper end, forming the terminal end portion of a passageway 26 extending along said nozzle. A wall 27 of the nozzle has a cut-away portion 29, herein shown as being cut-away along radial lines to afford access to the passageway 26 and the orifice 25. The cut-away portion 29 is on the opposite side of the nozzle from the windshield, in order to be readily accessible, and extends for the length of the nozzle. An insert 31 in the form of a sector conforming to the contour of the nozzle is adapted to detachably fit in the cut-away portion 29 to maintain a closed passageway 26 for windshield washing fluid. The insert 31, as shown in FIGURE 2, has a tip 30 adapted to be engaged by the fingers at its extreme outer end and extends downwardly into an upwardly facing recess 32 formed in the upper face of the boss 23 and is so shaped as to snugly engage the cut-away portion 29 for the length thereof. The means for holding the insert 31 in position to maintain a closed passageway to the orifice 25 is shown as being a spring clip 33 having lower fingers 35 clipped about the body of the wall portion 27 and having a spring finger 37 extending upwardly and engaging a notch 38 at the upper end portion of the insert 31, to maintain said insert in position in the cut-away portion 29.

The insert 31 may be made from metal, or may be made from a plastic material, such as nylon or Teflon or from rubber or one of the well known substitutes for rubber, and is so formed as to seal the passageway 26 and to prevent the leakage of windshield cleansing fluid along said insert.

During operation of the windshield washer, as the passageway 26 or orifice 25 becomes clogged, it is merely necessary to engage the tip 30 with the finger and move the insert 31 outwardly against the spring finger 37. The pressure of fluid will then clear the passageway 26. If, however, the passageway should not be cleared by pressure, the clip 33 retaining the insert 31 in position may be removed to accommodate removal of said insert.

Access may then be had to the passageway 26 to enable the discharge end portion of said passageway to readily be cleaned by the fingers or by any suitable object.

It may be seen from the foregoing that a simplified form of nozzle particularly adapted for windshield washers has been provided, materially simplifying the cleaning problem of the nozzle and enabling access to be had to the fluid passageway extending along the nozzle by the simple opening of an elongated sector of the wall portion of the nozzle, and accommodating the pressure of fluid passing through said nozzle to clear the nozzle passageway and orifice.

It may further be seen that the nozzle may readily be cleaned without disconnecting any of the hose connections or removing the nozzle from the automotive vehicle and that if the nozzle cannot be cleaned by the fingers, no tools other than a pin, nail or other pointed object are required to clean the nozzle.

While I have herein shown and described one form in which my invention may be embodied, it may readily be understood that various variations and modifications in the invention may be attained without departing from the spirit and scope of the novel concepts thereof.

I claim as my invention:

1. A nozzle for windshield washers and the like comprising a boss, a nozzle member extending upwardly from said boss and curving from said boss toward the windshield, a passageway extending along said nozzle member having an orifice at the upper outer end thereof, said nozzle member having a cut-away wall portion on the opposite sides thereof from the windshield and having a removable insert closing said cut-away wall portion and extending for the length thereof, and a spring clip clipped to said nozzle member adjacent said boss and having a spring finger extending upwardly therefrom along said insert, having yieldable engagement with said removable insert, adjacent the upper end thereof.

2. A nozzle for windshield washers and the like comprising a boss adapted to abut the cowl of an automotive vehicle and having a nipple depending therefrom through the cowl, a gland nut threaded on said nipple and retaining said nozzle to the cowl, said nozzle also having an upright nozzle member having a passageway extending therealong having an orifice at the upper end thereof directed to spray water on the windshield of an automotive vehicle and having a cut-away wall portion affording access to said passageway and extending therealong, an insert conforming to said nozzle member and said cut-away portion for closing said cut-away portion and providing a continuous passageway along said nozzle member and completing said orifice at its terminal end, and means detachably holding said insert in position on said nozzle member, comprising a spring clip having curvate fingers clipped about said nozzle member adjacent said boss and having a spring finger extending upwardly therefrom engaging said insert and maintaining said insert in engagement with said cut-away portion.

3. A self-cleaning nozzle comprising a nozzle member in the form of a spout having a passageway extending therealong, an inlet to said passageway and a discharge orifice forming the terminal end of said passageway, said nozzle member having an annular wall portion having a cut-away portion extending for the length thereof and having generally radial walls leading to said passageway, a removable sector conforming to said cut-away portion and extending for the length thereof, and a spring clip at one end of said sector engaging said sector and extending partially about said nozzle member and having a finger extending therefrom engaging said sector and maintaining said sector in engagement with the radial walls of said cut-away portion to maintain a continuous fluid passageway from said inlet to said orifice.

4. A self-cleaning nozzle comprising a boss, a nipple leading from said boss in one direction and having an inlet passageway extending therealong, a nozzle member leading from said boss in an opposite direction and having a passageway extending therealong in communication with said inlet and terminating in an orifice at the outer end of said nozzle member, said nozzle member having a generally annular wall portion defining said inlet passageway at its inner margin and cut-away along radial lines for the length thereof to afford access to said passageway, said boss having a recess therein registering with said cut-away portion of said nozzle member, and means closing said passageway and accommodating ready access thereto comprising an insert having wall portions conforming to the radial wall portions of said cut-away portion and fitting in said recess in said boss and extending along said cut-away portion to the outer end thereof and maintaining a continuous closed passageway along said nozzle member, and means detachably maintaining said insert in position in said cut-away portion comprising a spring clip having curvate fingers clipped about said wall portion adjacent said boss and engaging said insert adjacent said recessed portion of said boss and having a spring finger extending therealong yieldably engaging the opposite end of said insert from said boss and maintaining said insert in leakproof relation with respect to said cut-away wall portion.

5. A self-cleaning nozzle comprising a nozzle member having a passageway extending therealong, an inlet to said passageway and a discharge orifice leading from said passageway, said nozzle member having a cut-away portion affording access to said passageway and orifice, a removable insert conforming to said cut-away portion and extending for the length thereof, and a leaf spring clip secured to said nozzle member and having an end portion extending therefrom engaging said insert adjacent said orifice and maintaining said insert in engagement with the walls of said cut-away portion to maintain a continuous fluid passageway from said inlet to said orifice.

6. A nozzle for windshield washers and the like comprising a boss adapted to abut the cowl of an automotive vehicle and having a nipple depending therefrom through the cowl, a gland nut threaded on said nipple and retaining said nozzle to the cowl, said nozzle also having an upright nozzle member having a passageway extending therealong having an orifice at the upper end thereof directed to spray water on the windshield of an automotive vehicle and having a cut-away wall portion affording access to said passageway and orifice, an insert conforming to said nozzle member and said cut-away portion for closing said cut-away portion and providing a continuous passageway along said nozzle member to said orifice and completing said orifice at its terminal end, and means detachably holding said insert in position on said nozzle member, comprising a leaf spring secured to said nozzle member and having a free end engaging said insert and maintaining said insert in engagement with said cut-away portion.

References Cited in the file of this patent

UNITED STATES PATENTS

| | | |
|---|---|---|
| 502,742 | McGowen | Aug. 8, 1893 |
| 525,507 | Neumeyer | Sept. 4, 1894 |
| 1,622,090 | Comins et al. | Mar. 22, 1927 |
| 2,008,636 | Bryon | July 16, 1935 |
| 2,772,115 | Stanley | Nov. 27, 1956 |
| 2,898,036 | Newill | Aug. 4, 1959 |

FOREIGN PATENTS

| | | |
|---|---|---|
| 296,943 | Switzerland | May 17, 1954 |